UNITED STATES PATENT OFFICE 2,238,955

PREGNENDIONES AND A METHOD OF PRODUCING THE SAME

Lothar Strassberger, Berlin-Wilmersdorf, Germany, assignor, by mesne assignments, to Schering Corporation, Bloomfield, N. J., a corporation of New Jersey No Drawing. Application December 28, 1936, Serial No. 117,879. In Germany December 30, 1935

11 Claims. (Cl. 260—397)

This invention relates to pregnendiones and a method of producing the same.

According to the present invention the method of producing pregnendiones consists in subjecting pregnendiols to the action of oxidizing agents capable of transforming a secondary alcohol group into a keto group. The pregnendiols may be of the $\Delta_4$ or $\Delta_5$ type.

As oxidizing agents particularly compounds of the 6-valent chromium, such as chromic acid anhydride or the like, are to be taken into consideration; during this oxidation the ring double bond is suitably protected from the action of the oxidizing agent e. g. by intermediary addition of halogen, such as chlorine or bromine or halogen hydride, as otherwise only low yields are obtained on account of the formation of undesired by-products. The added halogen or halogen anhydride becomes attached to carbon located between the 3- and 7-carbons.

The invention may be further illustrated by the following example without, however, limiting the same to it.

Example

To a solution of 3.18 g. of pregnendiol-3,20 in 100 ccs. of glacial acetic acid a solution of 1.6 g. of bromine in 20 ccs. of glacial acetic acid and a solution of 2.6 g. chromium trioxide in 20 ccs. of 90% acetic acid are successively added. The mixture is allowed to stand at room temperature for 48 hours whereafter it is mixed with 5 ccs. of methanol and 20 g. of zinc dust and stirred at 15–20° C. for 9–10 hours. Thereupon the remaining zinc dust is filtered off from the solution and the filtrate is poured into 1 liter of water and repeatedly extracted with ether; the ethereal solution is freed from acid constitutents and water. Thereupon the ether is evaporated and the residue recrystallised from 90% methanol. About 1.5 g. of the diketone pregnendione-3,20 having a melting point of 128° C. are obtained.

Under the conditions given it is advisable to use such an amount of the oxidizing agent that 4 atoms of oxygen are available for the oxidation of 1 molecule of the pregnendiol. The amount of the oxidizing agent, however, depends also on the type and concentration of the compound used, on the temperature of the reaction, on the solvent and so on. If the oxidizing agent is used in a too small amount the yield diminishes, a part of the starting material being recovered, whereas in the other case the oxidation proceeds too far and by-products, such as other hydroxy or oxo compounds or acids and the like are formed by attacking the ring system or by splitting off the side chain.

The oxidation is suitably carried out with chromic acid anhydride but also other compounds of the 6-valent chromium, such as chromic oxychloride, bichromates in acid solution and the like may be applied. One may also resort to alkali permanganates or alkaline earth permanganates and other known agents capable of transforming a secondary alcohol group into a keto group without essentially attacking the ring system and/or splitting off the side chain, e. g. copper oxide.

The splitting off of halogen from the dihalogenated compounds can be carried out not only with zinc dust as described in the example but also by other suitable methods, for instance by treating with sodium iodide in acetone according to the method of Finkelstein, by careful treating with hydrogen in the presence of catalysts, such as platinum or nickel and of basic agents, care being taken that no hydrogenation of the ring double bond occurs, or in any other manner as described, for instance, described in Houben-Weyl, Methods of Organic Chemistry, 2 ed. 2 vol. p. 301–04.

In case that halogen hydride has been added to the ring double bond, it may be split off for reestablishing the ring double bond, for instance, with pyridine bases, alkaline acetates in alcoholic solution or by other alkaline agents as they are described, for example, in Houben-Weyl, Methods of Organic Chemistry 2 ed. 2 vol., pages 746 sequ., Leipzig 1922.

Instead of the free pregnendiols one may also start from their derivatives wherein the hydroxy groups wholly or partly are replaced by groups that upon hydrolysis can be reconverted into the hydroxy group. Thus, for instance, the esters of the ethers of the pregnendiols can be used as starting materials which are then converted into pregnendiols before or during the oxidation.

The halogenation of the starting materials can be carried out with bromine not only in acetic acid solution as described in the example, but also in other solvents that are not attacked by halogen, such as chloroform, carbon-tetra-chloride and the like.

The isolation and the purification of the diketones formed can also be carried out by any other manner than described in the example, thus, for instance, one may rely on fractional distillation or sublimation in high vacuum. The diketone can also be isolated by means of ketone reagents as, for instance, semicarbazide, thiosemicarbazide, phenylhydrazine and other agents capable of condensing with a keto group. To such agents besides those named belong furthermore hydroxyl amine, the substituted products of phenylhydrazine, such as p-nitrophenylhydrazine, p-bromophenylhydrazine, diphenylhydrazine and the like, benzylhydrazides, quaternary ammoniumacetohydrazides, such as trimethylacetohydrazide ammonium chloride, acetohydrazide pyridinium chloride and the like. The splitting off of the compounds obtained by the action of the ketone reagents, for instance the splitting off of the semicarbazones and the like, is carried out in usual manner, for instance, by using acid agents usually in the presence of suitable solvents.

Of course, various other modifications in the procedure of the process of the present invention may be resorted to within the scope of the appended claims without departing from the principles set forth herein.

The pregnendiones obtained according to the process of the present invention are valuable compounds; thus, for instance, the pregnendione-3,20 of the melting point of 128° C. as obtained by the oxidation of pregnendiol-3,20 according to the above example shows the properties attributed to the natural corpus luteum hormone.

What I claim is:

1. Process for the production of pregnendiones comprising subjecting a member of the group consisting of $\Delta_4$-pregnendiol halide and dihalide to the action of an oxidizing agent capable of transforming a secondary alcohol group into a keto group, and subsequently treating the oxidation product with an agent capable of removing halogen or halogen halide, respectively, to restore the double bond.

2. Process according to claim 1, characterised in that an oxygen-liberating compound of 6-valent chromium is used as oxidizing agent.

3. Process according to claim 1, characterised in that derivatives of the pregnendiols are used as starting materials wherein the hydroxyl groups wholly or partly are substituted by groups that before the oxidation procedure are converted into hydroxyl groups.

4. Process according to claim 1 wherein the oxidizing agent is copper oxide.

5. Process according to claim 1, characterised in that derivatives of the pregnendiols are used as starting materials wherein the hydroxyl groups wholly or partly are substituted by groups that during the oxidation procedure are converted into hydroxyl groups.

6. Process for the production of pregnendione, comprising adding halogen hydride to pregnendiol to saturate the double bond, and then subjecting the pregnendiol halide to the action of an oxidizing agent capable of transforming a secondary alcohol group into a keto group.

7. Process according to claim 6, including the step of reacting the oxidation product with an agent capable of splitting off halogen hydride to restore the double bond.

8. Process for the production of pregnendiones, comprising subjecting an addition product of pregnendiol and a member of the group consisting of halogen and hydrogen halide to the action of chromium trioxide in acetic acid solution at room temperature, and thereafter treating the reaction product with an agent capable of removing halogen or halogen halide, respectively, to restore the double bond.

9. A monohalogenated pregnandiol of the general formula $C_{21}H_{35}O_2Cl$ the chlorine being attached to a carbon located between the 3- and 7-carbons.

10. A dihalogenated pregnandiol of the general formula $C_{21}H_{34}O_2Br_2$, the bromine being located at the carbon atoms 4 and 5.

11. Halogen containing pregnandiols of the general formula $C_{21}H_{34}O_2XY$, wherein XY indicate a member of the group consisting of 2 halogen atoms and halogen hydride attached to the carbon atoms 4 and 5.

LOTHAR STRASSBERGER.